United States Patent [19]

Pluequet

[11] Patent Number: 4,483,140

[45] Date of Patent: * Nov. 20, 1984

[54] EXHAUST GAS CONDUIT SYSTEM FOR MULTI-CYLINDER RECIPROCATING PISTON INTERNAL COMBUSTION ENGINES

[75] Inventor: Heinz Pluequet, Cologne, Fed. Rep. of Germany

[73] Assignee: Klöckner-Humboldt-Deutz AG, Cologne, Fed. Rep. of Germany

[*] Notice: The portion of the term of this patent subsequent to Jun. 16, 1998 has been disclaimed.

[21] Appl. No.: 290,015

[22] Filed: Aug. 4, 1981

Related U.S. Application Data

[60] Continuation-in-part of Ser. No. 225,338, Jan. 15, 1981, , which is a division of Ser. No. 948,438, Oct. 4, 1978, Pat. No. 4,273,080.

[30] Foreign Application Priority Data

Oct. 6, 1977 [DE] Fed. Rep. of Germany ....... 2744964

[51] Int. Cl.³ .............................................. F01N 7/06
[52] U.S. Cl. ................................................... 60/321
[58] Field of Search ........................ 60/321, 320, 298

[56] References Cited

U.S. PATENT DOCUMENTS

| | | | |
|---|---|---|---|
| 1,936,698 | 11/1933 | Vincent | 60/321 |
| 2,886,945 | 5/1959 | Hofer | 60/321 |
| 3,109,715 | 11/1963 | Johnson | 60/298 |
| 3,142,150 | 7/1964 | Pearlman | 60/298 |
| 3,206,836 | 9/1965 | Schlussler | 60/321 |
| 3,485,040 | 12/1969 | Niskanen | 60/321 |
| 3,798,904 | 3/1974 | Gleason | 60/320 |
| 4,179,884 | 12/1979 | Koeslin | 60/321 |

FOREIGN PATENT DOCUMENTS 369594  3/1939  Italy .................................... 60/321

*Primary Examiner*—Douglas Hart
*Attorney, Agent, or Firm*—Becker & Becker, Inc.

[57] ABSTRACT

An exhaust gas conduit system for a multi-cylinder reciprocating piston internal combustion engine having its cylinders arranged in at least one cylinder row and provided with a cylinder head having an exhaust manifold connected thereto; exhaust gas conduits establish communication between the respective cylinder and the pertaining cylinder head and are respectively surrounded by the water cooled insulating walls. Each of the water cooled insulating walls along the pertaining exhaust gas conduit is provided with longitudinal water chambers formed by wall portions of the insulating wall and by ribs supporting the water chamber forming wall portions relative to each other.

8 Claims, 7 Drawing Figures

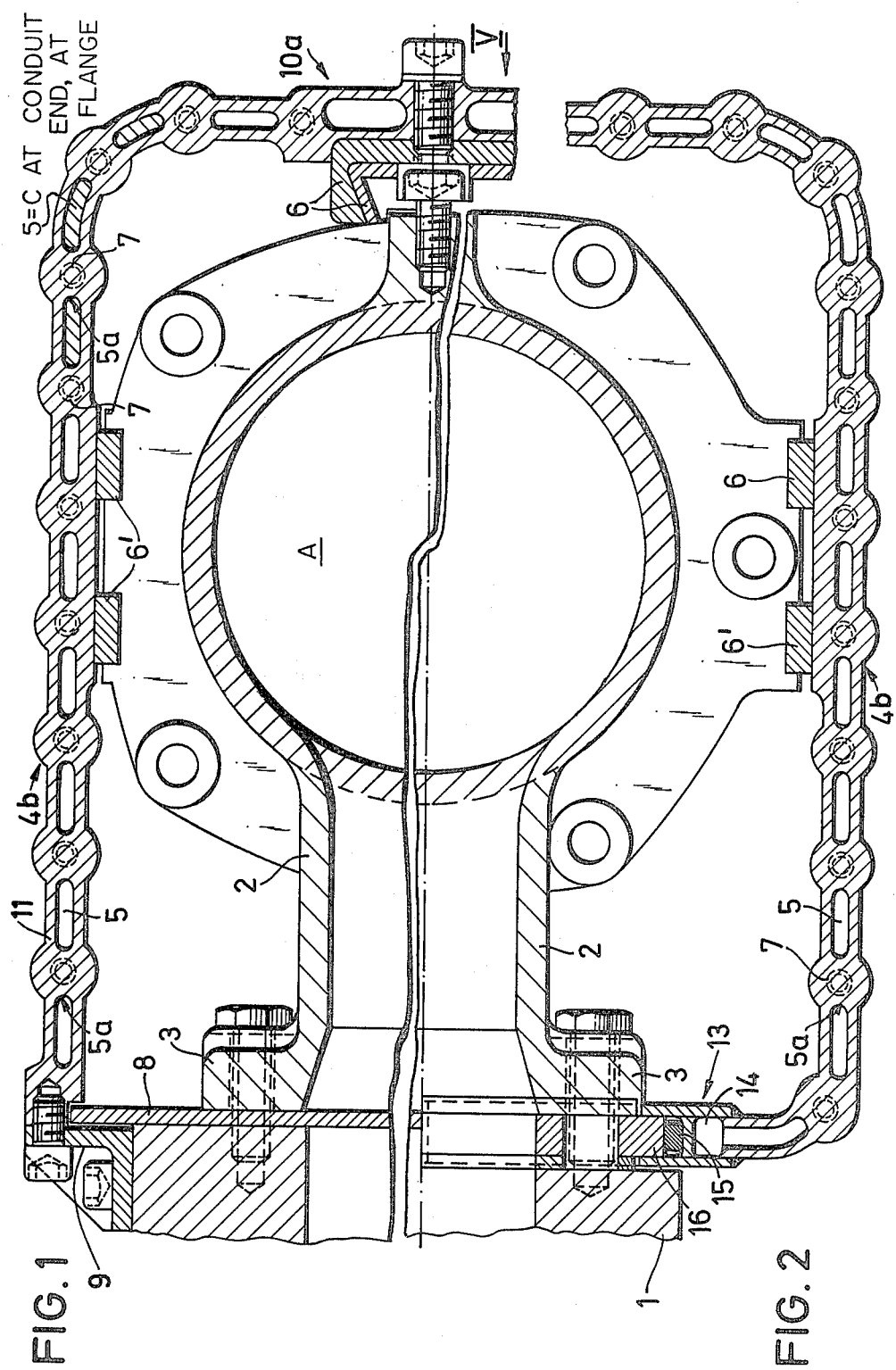

EXHAUST GAS CONDUIT SYSTEM FOR MULTI-CYLINDER RECIPROCATING PISTON INTERNAL COMBUSTION ENGINES

This is a continuation-in-part application based on copending divisional application Ser. No. 225,338-Pluequet filed Jan. 15, 1981 for parent application Ser. No. 948,438-Pluequet filed Oct. 4, 1978, now U.S. Pat. No. 4,273,080-Pluequet issued June 16, 1981.

The present invention relates to an exhaust gas conduit system for multi-cylinder reciprocating internal combustion engines with at least one cylinder row, in which the exhaust gas conduit is connected by means of flanges joined to exhaust gas passages of the cylinder head or of the cylinder heads and is surrounded by a water-cooled insulating wall, and in which between the exhaust gas conduit and the insulating wall there are provided supporting points.

An exhaust gas conduit system of the above mentioned general type has become known according to which the water-cooled insulating wall forms the support proper for the exhaust gas conduit and, by means of water-cooled connections forming one piece with the insulating wall, is connected to the cylinder heads. The exhaust gas conduit is braced within the tubular insulating wall and is held by the latter. This exhaust gas conduit system is, however, complicated in construction, is very expensive and heavy because the insulating wall has to be made of cast iron. Furthermore, the insulating wall is connected positively by said mentioned connections to the cooling circuit of the internal combustion engine. As a result thereof, the temperature of the insulating wall is always dependent on the temperature of the internal combustion engine and cannot be reduced at will.

It is, therefore, an object of the present invention to provide an exhaust gas conduit system which will overcome the above mentioned drawbacks and which will be simple in construction and which can be more economically produced.

This object and other objects and advantages of the invention will appear more clearly from the following specification in connection with the accompanying drawings, in which:

FIG. 1 is a partial cross section through an exhaust gas conduit system according to the invention with partial section through the adjacent cylinder head.

FIG. 2 is a partial cross section through the exhaust gas conduit system of FIG. 1 in which, however, the connection within the region of the cylinder head has been modified.

Figure 3:
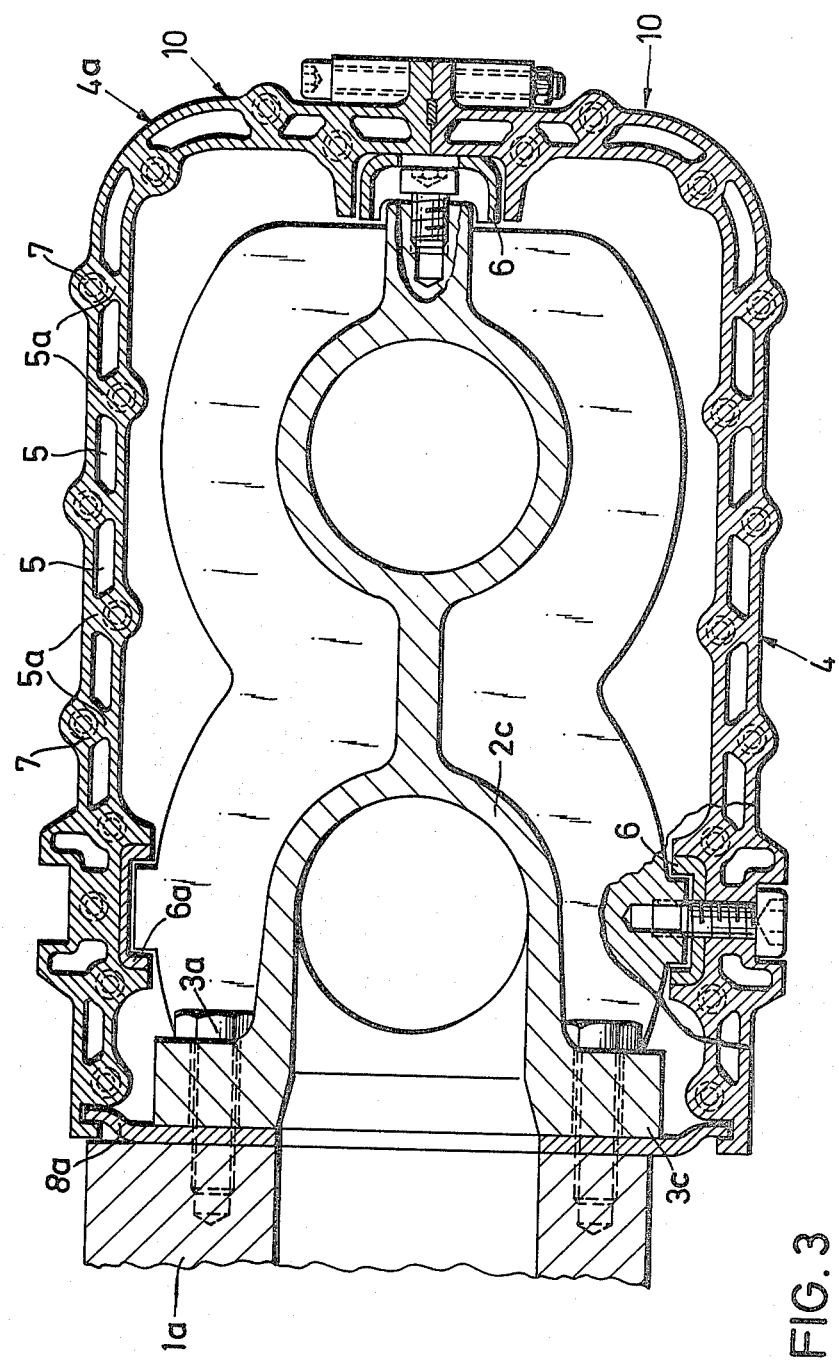
FIG. 3 represents a cross section through an exhaust gas conduit system according to FIG. 1, in which the insulating wall is composed of two bowl-shaped profiles.

The exhaust gas conduit system according to the invention is characterized primarily in that the insulating wall comprises longitudinal water chambers extending along the exhaust gas conduit, while these water chambers are formed by the walls of the insulating wall and the ribs supporting or bracing the latter. The dividing-up of the insulating wall into longitudinal water chambers has the particular advantages that the cooling water is being guided precisely whereby a highly satisfactory cooling of the insulating wall is made possible which is uniformly distributed over the entire circumference of the insulating wall. Furthermore, this way of conveying the water makes it possible to cool the insulating wall separately from the remaining parts of the internal combustion engine, while also considerably lower temperatures than that of the cooling water of the internal combustion engine can be realized.

By dividing-up the insulating wall into longitudinal water chambers, it is possible to produce the insulating wall and its profiles in a continuous process, for instance as extrusion members, of light metal, whereby a wall can be obtained which is particularly economical. This design also makes it possible to produce the insulating wall or walls of thin-walled metallic cover sheets with rectangular profiles which extend parallel to each other and which can be interconnected, preferably by hard soldering in a continuous heating furnace or in a pusher type furnace. The thus obtained insulating walls or profiles of any desired length can be extended by means of welded-on or screwed-on connecting flanges or they can be closed by closing covers or lids. In this connection, the screws are inserted into the rectangular profiles or in reinforcements of the ribs when the structure is made of light metal.

In order to be able to use also raw water, i.e. non-purified and non-filtered water, as it is available in this form of river or sea water, for cooling the insulating wall, all passages may be widened to such an extent that no clogging up can occur, especially with regard to the raw water referred to above. A particularly wear-resistant insulating wall is obtained when employing metallic cover sheets alloyed with copper and nickel.

Referring now to the drawings in detail, in FIGS. 1-4 there is shown a cylinder head 1 which is only partially illustrated to show its connection with the exhaust gas conduit. The cylinder head 1 is followed by an exhaust gas conduit 2 which by means of flanges 3 is connected to the cylinder head 1. Around the exhaust gas conduit 2 there is provided an insulating wall generally designated with the reference numeral 4, which prevents any direct contact with the exhaust gas conduit. The insulating wall 4 comprises longitudinal water chambers 5 which extend along the entire insulating wall or along the sections of the insulating wall arranged one behind the other and which are passed through by the cooling water. The longitudinal water chambers 5 are separated from each other by ribs 5a. In the region of the lateral surfaces of the insulating wall 4 and on the upper and lower sides there are provided intermediate members 6, 6' which may be screwed thereto and which permit to support or brace the insulating wall and the exhaust gas conduit 2 relative to each other while simultaneously, however, permitting a displacement.

The insulating wall 4 according to FIG. 1 is made as a single piece and surrounds the exhaust gas conduit 2 in a U-shaped manner. To obtain an economical manufacturing process, the wall 4 is made as a cast or extruded member of light metal while, depending on the respective motor, a plurality of sections may be arranged one behind the other. These sections are interconnected by nonillustrated connecting flanges. These connecting flanges are connected by screws joined to the insulating wall, the screws being located in the screw receiving parts 7. The screw receiving parts 7 are provided in the ribs 5a which separate the water chambers 5 from each other. Between the flanges 3 of the exhaust gas conduit 2 and the cylinder head 1 there is connected a sealing element 8, having an end region thereof substantially parallel to an angle profile 9 which is connected to the cylinder head 1. This end region also serves as connection for the insulating wall 4. The connecting screw for the intermediate member 6 of the lateral surface is likewise arranged in a rib 5a of the insulating wall 4.

The exhaust gas conduit system illustrated in FIG. 3 essentially corresponds to that of FIG. 1, and the similar parts have been designated with the same reference numerals as in FIG. 1 but with the additional letter character "a". The essential difference between FIGS. 1 and 3 consists in that the insulating wall 4a consists of two bowl-shaped profiles 10 which are screwed to each other in the region of the lateral surface. In the vicinity of the cylinder head 1a, the bowl-shaped profiles 10 are interconnected or hooked together with the sealing element 8a. This is possible because the bowl-shaped profiles 10 are connected also in the region of the upper and lower intermediate members 6a joined to the exhaust gas conduit 2. In contrast to the embodiment of FIG. 1, the ribs 5a of the bowl-shaped profiles of FIG. 3 have outwardly extending extensions of the ribs which results in an increased rigidity of the profiles. In this connection, the ribs 5a are alternately extended inwardly and outwardly beyond the wall, while the screw supporting sections 7a are correspondingly offset with respect to FIG. 1.

Figure 4:
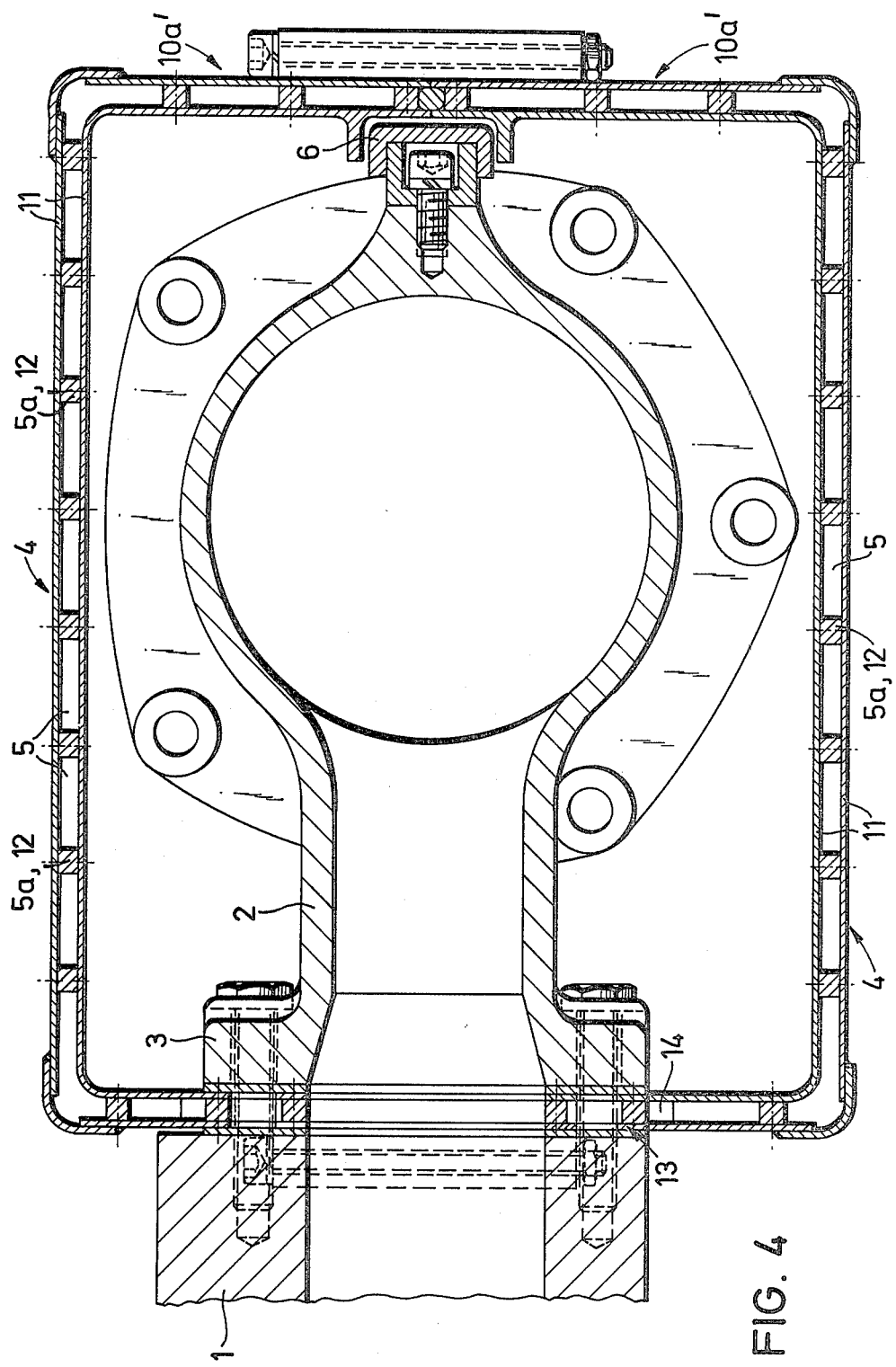
FIG. 4 represents a cross section through an exhaust gas conduit system in which the insulating wall is made from metallic cover sheets with interposed rectangular profiles and comprises two bowl-shaped profiles.

In connection with the exhaust gas conduit system according to FIGS. 2 and 4, in which the insulating walls are designed in a similar manner, the following description applies to these two figures. The difference consists in that the insulating wall 4b of FIG. 2, which is divided into the bowl-shaped profiles 10a, is made of extrusion parts of light metal in conformity with the embodiments of FIGS. 1 and 3, whereas the bowl-shaped profiles 10a' according to FIG. 4 are made of thin-walled metallic cover sheets 11 having inner rectangular profiles 12. The cover sheets are hard soldered to the rectangular profiles in a continuous heating furnace or pusher type furnace. The profiles 10 are, in conformity with the previous embodiments, screwed to each other and through one or more intermediate members 6' rest against the exhaust gas conduit, 2c. In the region of the flanges 3c of the exhaust gas conduit, the bowl-shapes profiles 10a are provided with mechanically produced recesses into which the the inserts 13 are welded or soldered. These inserts 13 together with the insulating wall 4 form an annular water chamber 14 though which the interrupted longitudinal water chambers 5 are connected to each other. On the inside, the inserts 13 via the intervention of an O-ring 15 (FIG. 2) are supported by a spacer ring 16 which is braced between the flanges 3 and the cylinder head 1.

Figure 5:
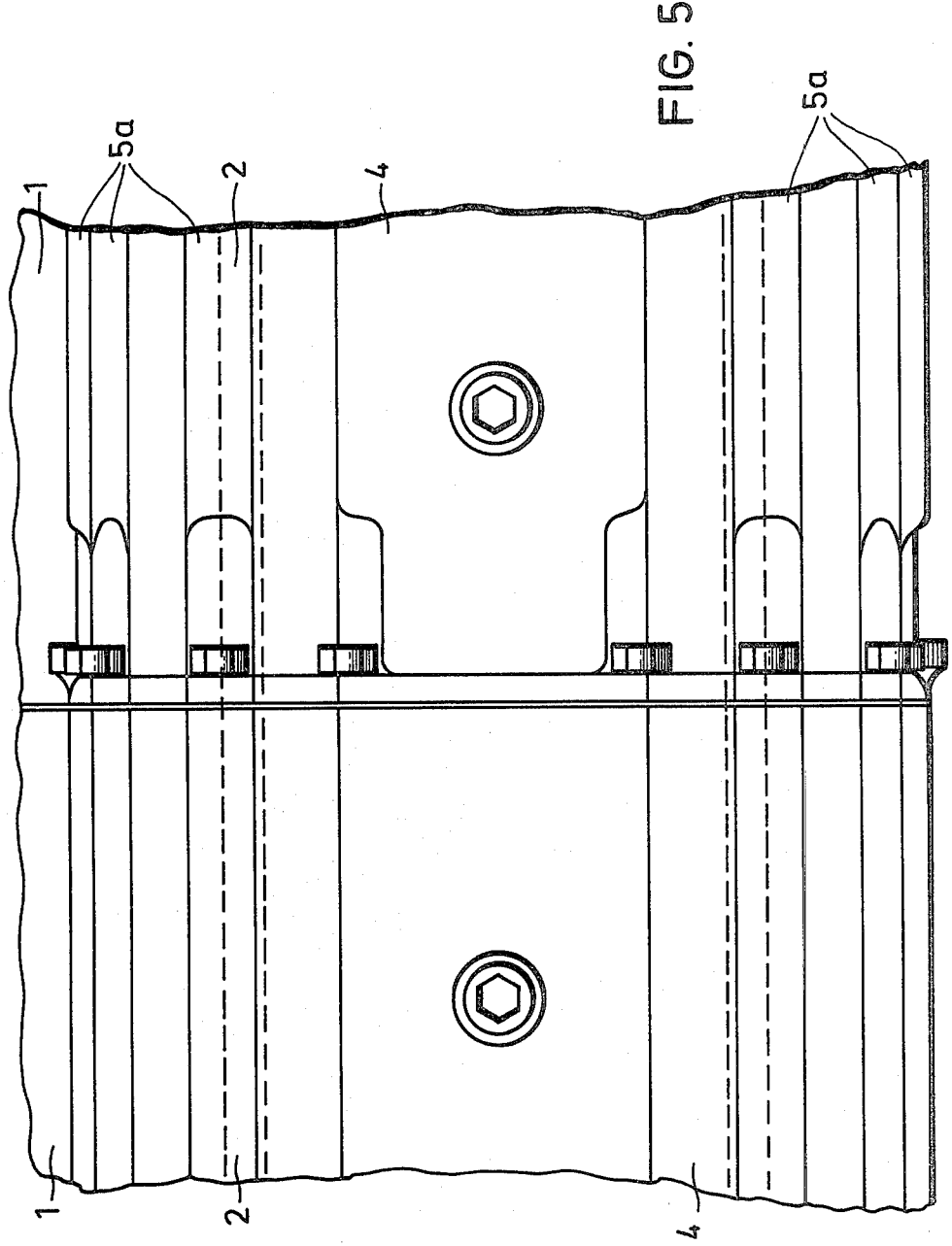
FIG. 5 is a side view of the exhaust gas manifold system in the direction of arrow V in FIG. 1.

FIG. 5 provides a side view of the exhaust manifold or conduit system according to a view taken in the direction of an arrow V as marked in FIG. 1. In this illustration there are shown basically only the reference numerals mentioned in the previous description.

The present invention relates to an exhaust manifold or conduit system for a multiple cylinder reciprocable piston internal combustion engine with at least one row of cylinders whereby the exhaust conduit is connected by flanges to the exhaust gas conduits of the cylinder head (s) and is surrounded by a water-cooled insulating wall and whereby between the exhaust conduit and the insulating wall supporting points are provided. Under these circumstances the exhaust gas manifold or conduit inventively has the following features:

(1) The insulating wall 4 has longitudinal water chambers 5 extending along the exhaust gas conduit 2 and these chambers 5 are limited or bounded by the walls 11 of the insulating wall and ribs 5a supporting these walls 11 against each other.

(2) The insulating wall 4 comprises several sequentially arranged parts or partial pieces.

(3) Connection flanges are fastened to the end or face sides of the parts or partial pieces and these connection flanges provide openings which communicate or are connected with the longitudinal water chambers.

The advantages of the inventive exhaust gas manifold or conduit system include both a small cost and minimum complexity from a finishing technology standpoint during the production and also a realization and actual obtaining of an optimum exhaust gas system insulation with small radiation heat so that high temperatures can be avoided in machine rooms of ships as well as under certain circumstances the danger of fire being avoided. By the dividing of the cooling water chamber formed between the walls of the insulating wall separated into longitudinal water chambers there can be attained an advantageous heat transporting or conveying with uniform efficiency along the periphery or circumference of the insulating wall. Since the insulation of the exhaust gas conduit comprises several parts or partial pieces placed against each other which all have the same construction there exists the possibility to use this system which can be produced in an economical and inexpensive manner in a strandcasting or extrusion method for utilization within a motor construction row or line for every number of cylinder units. The construction of an exhaust gas conduit system from parts or partial pieces additionally simplifies the assembly work and service work necessary in the region of the cylinder head as well as in the region of the exhaust system. Consequently, for instance, with the disassembly of an individual cylinder head, only one part or partial piece of the exhaust gas conduit system needs to be removed under such circumstances.

The exhaust conduit is surrounded by the insulating wall with a U-shape whereby, through the arrangement of intermediate pieces between the insulating wall and the exhaust gas conduit, relative movements are made possible which are caused due to different heat expansion and oscillations of the construction parts. Advantageous possibilities include the cooling water guidance between the parts or partial pieces of the insulating wall as well as in the region of the flange means screwed with respect to the cylinder head. In this connection directions are also given for secure sealing of the water-conveying parts of the insulating wall.

U.S. Pat. No. 4,179,884-Koeslin issued Dec. 25, 1979 offers basis for only a few comparison possibilities with the teaching of the present invention. The waste gas conduit system illustrated in the Koeslin reference comprises three coaxially telescoped pipes or tubes whereby between the inner exhaust gas pipe or tube and the adjoining insulating pipe or tube there is provided a radial air gap and between this insulating pipe or tube and a further insulating pipe or tube there is provided a radial cooling water chamber. The utilized construction elements including pipes, cover, flange and the like are joined by welding and consequently involve large finishing complexity for the exhaust gas system. Under these circumstances, the exhaust gas conduit system does not comprise joined parts or partial pieces but rather is produced in one piece and respectively according to the number of cylinder units has different measurements. Additionally, the telescoped pipes or tubes tend to oscillate and these pipes or tubes are fastened only in the region of the covers and flanges relative to each other, and these oscillations accompanied by differing heat expansion lead to tears or crack formations in the region of the weld connections. Since the insulating wall provides no longitudinal water chambers, in the present situation also there cannot be created any sought water cooling flow and no high flowing speed of the cooling water can be created advantageously for the heat exchange.

The prior art generally relates to exhaust gas system insulations with which the exhaust gas conduit is directly surrounded by cooling water flow. Consequently, however, the cooling water is strongly heated up so that the temperature assumes undesired high value at the surface of the exhaust gas system and additionally neither the exhaust gas conduit nor the insulating wall has been produced from parts or partial pieces and, since the entire construction of the exhaust gas conduit system provides no similarity with the present inventive construction, consequently the production of longitudinal water chambers is not provided by the prior art.

The structure of the present invention is provided with a cylinder head and an exhaust gas conduit, or exhaust gas conduits respectively to establish communication between the respective cylinder and the pertaining cylinder head, and including water cooled insulating walls respectively surrounding exhaust gas conduits.

The exhaust gas conduit is surrounded by the insulating wall and extends along the cylinder row along which the water longitudinal chambers extend in a manner corresponding to a construction part illustrated in the drawing with a circular cross section; this construction part extends at right angles to the plane of the drawing. The expression "exhaust gas conduit" is correctly selected for this purpose.

The inner exhaust gas passages or channels in the cylinder head which establish the connection to the cylinders as described are shown in the drawings only by an indication in the cylinder head 1 and have no relation to the insulating wall. Such inner exhaust gas passages cannot be likewise designated as "exhaust gas conduits".

Furthermore, there is mention made of water cooled insulating walls respectively surrounding said exhaust gas conduits as well as having water chambers therewith and extending in the longitudinal direction thereof. With this wording there is expressed that the insulating wall is to extend along the waste gas conduit which however was not intended and which is capable of being misunderstood since the insulating wall simultaneously surrounds the waste gas conduit.

Correctly, the feature relates to the water chambers which are to be arranged clearly along the waste gas conduit. In the following, there is mention made of water chamber forming wall sections of said insulating walls. With these words there are meant the parallel walls of the insulating wall. Furthermore, the expression "sections" is in relation to or with reference to the "insulating wall" though always related to the longitudinal segments of the insulating wall. There seems to be lacking additionally every reference or indication that, between the waste gas or exhaust gas conduit and the insulating wall, support points are provided.

Figure 6:
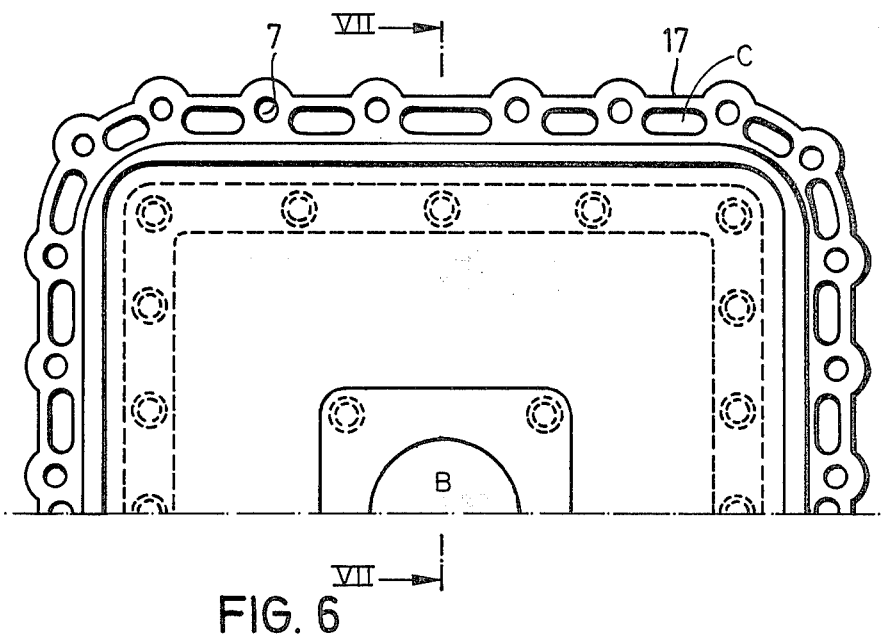
FIG. 6 is a fragmentary plan view of structure to form water chambers.
Figure 7:
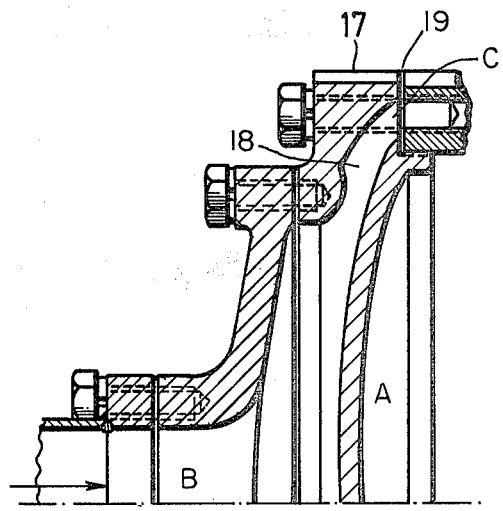
FIG. 7 is a fragmentary sectional view taken along line VII—VII in FIG. 6.

The closure cover means identified by reference numeral 17 in FIGS. 6 and 7 are in a position first to form the water chambers 18 in communication with water supply B and withdrawal passages C. The insulating wall is connected in a U-shape to the cylinder head. A seal 19 is provided relative to the corresponding exhaust gas bend, collar or flange (bend, elbow, knee or flanged bend). FIGS. 6 and 7 show a head region of an exhaust gas wall configuration for exhaust duct A with the closure cover means 17.

It is, of course, to be understood that the present invention is, by no means, limited to the specific showing in the drawings but also encompasses any modifications within the scope of the appended claims.

What I claim is:

1. An exhaust gas conduit system for a multi-cylinder reciprocating piston internal combustion engine having its cylinders arranged in at least one cylinder row and respectively provided with a cylinder head and an exhaust gas conduit, which is connected with internal gas channels in the cylinder head, and water cooled insulating walls respectively surrounding said exhaust gas conduit and supporting items between said insulating walls and said exhaust gas conduit, said insulating walls having water chambers therein which extend in a longitudinal direction thereof and being formed collectively by the sides of said insulating walls and by ribs supporting said sides relative to each other, each insulating wall comprising cover means, a plurality of longitudinal sections provided with connecting flanges located adjacent to and connected with each other and outer connecting flanges connected with said cover means forming together therewith water chambers respectively connected to supply and withdrawal conduits for circulating cooling water therethrough.

2. An exhaust gas conduit system, said insulating walls at their connecting area with the respective exhaust gas conduit being provided with recesses having inserts sealingly connected thereto, and said exhaust gas conduits being connected to the pertaining cylinder head by flanges having recesses therein, said inserts on the one hand forming with the respective insulating walls an annular water chamber interconnecting the pertaining longitudinal water chambers and on the other hand being guided on a spacer ring between the respective cylinder head and the pertaining flange while a heat resistant O-ring is interposed between a spacer ring in the respective insert and the adjacent insulating wall.

3. An exhaust gas conduit system for a multi-cylinder reciprocating piston internal combustion engine having its cylinders arranged in at least one cylinder row and respectively provided with a cylinder head and an exhaust gas conduit, which is connected with internal gas channels in the cylinder head, and water cooled insulating walls respectively surrounding said exhaust gas conduit and supporting items between said insulating walls and said exhaust gas conduit, said insulating walls having water chambers therein which extend in a longitudinal direction thereof and being formed collectively by the sides of said insulating walls and by ribs supporting said sides relative to each other, each insulating wall comprising cover means, a plurality of longitudinal sections provided with connecting flanges located adjacent to and connected with each other and outer connecting flanges connected with said cover means forming together therewith water chambers respectively connected to supply and withdrawal conduits for circulating cooling water therethrough, said insulating walls at their connecting areas with the enclosed exhaust gas conduit being provided with recesses having inserts sealingly connected thereto, and said exhaust gas conduit being connected to the pertaining cylinder head by flanges having recesses therein, said inserts on the one hand with the respective insulating walls forming an annular water chamber interconnecting the pertaining longitudinal water chambers and on the other hand being guided on a spacer ring between the respective cylinder head and the pertaining flange while a heat resistant O-ring is interposed between a spacer ring in the respective insert and the adjacent insulating wall.

4. An exhaust gas conduit system for a multi-cylinder reciprocating piston internal combustion engine having its cylinders arranged in at least one cylinder row and respectively provided with a cylinder head and an exhaust gas conduit, in which said exhaust gas conduits respectively establish communication between passages of the respective cylinder and the pertaining cylinder head, and which includes water cooled insulating walls respectively surrounding said exhaust gas conduits as well as having water chambers therewith and extending in the longitudinal direction thereof and being formed by water chamber forming wall sections of said insulating walls and by ribs supporting said water chamber forming wall sections relative to each other, each insulating wall comprising a plurality of sections arranged one behind the other and provided with connections communicating with said water chambers for circulating cooling water longitudinally therethrough, said connections being welded to said sections.

5. An exhaust gas conduit system for a multi-cylinder reciprocating piston internal combustion engine having its cylinders arranged in at least one cylinder row and respectively provided with a cylinder head and an exhaust gas conduit, in which said exhaust gas conduits respectively establish communication between passages of the respective cylinder and the pertaining cylinder head, and which includes water cooled insulating walls respectively surrounding said exhaust gas conduits as well as having water chambers therewith and extending in the longitudinal direction thereof and being formed by water chamber forming wall sections of said insulating walls and by ribs supporting said water chamber forming wall sections relative to each other, each insulating wall comprising a plurality of sections arranged one behind the other and provided with connections communicating with said water chambers for circulating cooling water longitudinally therethrough, said connections being soldered to said sections.

6. An exhaust gas conduit system for a multi-cylinder reciprocating piston internal combustion engine having its cylinders arranged in at least one cylinder row and respectively provided with a cylinder head and an exhaust gas conduit, in which said exhaust gas conduits respectively establish communication between passges of the respective cylinder and the pertaining cylinder head, and which includes water cooled insulating walls respectively surrounding said exhaust gas conduits as well as having water chambers therewith and extending in the longitudinal direction thereof and being formed by water chamber forming wall sections of said insulating walls and by ribs supporting said water chamber forming wall sections relative to each other, each insulating wall comprising a plurality of sections arranged one behind the other and provided with connections communicating with said water chambers for circulating cooling water longitudinally therethrough, said connections being screwed onto said plurality of sections, and at least some of said ribs being thickened and provided with threads.

7. An exhaust gas conduit system for a multi-cylinder reciprocating piston internal combustion having its cylinders arranged in at least one cylinder row and respectively provided with a cylinder heads and an exhaust gas conduits and sealing members, in which said exhaust gas conduits respectively establish communication between passges of the respective cylinder and the pertaining cylinder head, and which includes water cooled insulating walls respectively surrounding said exhaust gas conduits as well as having water chambers therewith and extending in the longitudinal directional thereof and being formed by water chambers forming wall sections of said insulating walls and by ribs supporting said water chamber forming wall sections relative to each other, each of said insulating walls surrounding said exhaust gas conduits in a U-shaped manner and being sealingly connected to said sealing members arranged between said cylinder heads and said exhaust gas conduits.

8. An exhaust gas conduit system for a multi-cylinder reciprocating piston internal combustion engine having its cylinders arranged in at last one cylinder row and respectively provided with a cylinder head and an exhaust gas conduit, in which said exhaust gas conduits respectively establish communication between passages of the respective cylinder and the pertaining cylinder head, and which includes water cooled insulating walls respectively surrounding said exhaust gas conduits as well as having water chambers therewith and extending in the longitudinal direction thereof and being formed by water chamber forming wall sections of said insulating walls and by ribs supporting said water chamber forming wall sections relative to each other, wherein each insulating wall comprises a longitudinal section provided with connecting flanges, adjacent connecting flanges and closure cover means forming with each other water chambers adapted to be connected to supply and withdrawal conduits for circulating cooling water; and in which said insulating walls are at their connecting area with the respective exhaust gas conduit provided with recesses having inserts sealingly connected thereto, and in which said exhaust gas conduits are connected to the pertaining cylinder head by flanges having recesses therein, said inserts on the one hand forming with the respective insulating walls an annular water chamber interconnecting the pertaining longitudinal water chambers and on the other hand being guided on a spacer ring between the respective cylinder head and the pertaining flange while a heat resistant O-ring is interposed between a spacer ring in the respective insert and the adjacent insulating wall.

* * * * *